Sept. 14, 1926.

A. A. KAKUSKE

AUTO PEDAL LOCK

Filed Oct. 4, 1924

1,599,896

Inventor
Austin A. Kakuske

Patented Sept. 14, 1926.

1,599,896

UNITED STATES PATENT OFFICE.

AUSTIN A. KAKUSKE, OF JANESVILLE, WISCONSIN.

AUTO PEDAL LOCK.

Application filed October 4, 1924. Serial No. 741,613.

This invention relates to auto pedal locks.

Objects of this invention are to provide a lock which will securely retain the auto pedal or pedals in an inoperative condition so that the car may not be driven away from a place where it is parked, and to provide a lock in which a plurality of pedals may be locked in inoperative position if desired, by a single locking motion.

Further objects are to provide a lock for automobile pedals which is of very simple construction, which may be most easily applied to existing types of machines, and which is of strong and substantial construction, and which will successfully resist any attempt at tampering.

An embodiment of the invention is shown in the accompanying drawings, in which:—

Figure 1:
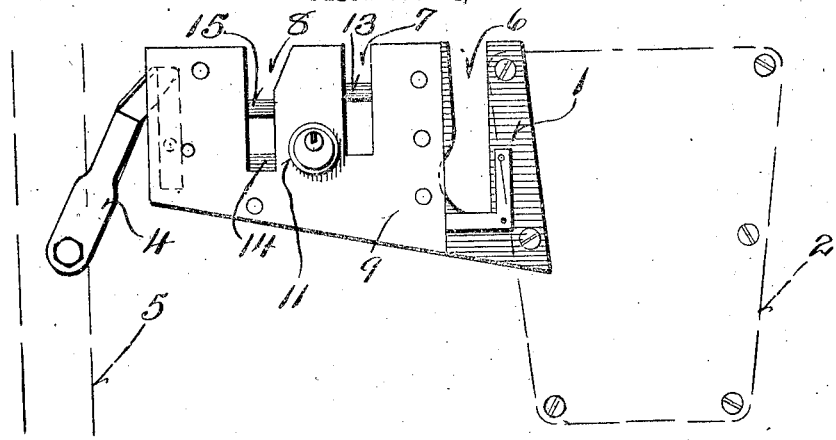
Figure 1 is a plan view of the device showing it in the position it occupies when attached to the automobile.

Referring to the drawings, it will be seen that the device comprises a base plate 1 which is bolted, as indicated in Figure 1, to the cover plate 2 of the transmission. In fact the the holes 3 in the base plate 1 are so formed that they will receive the usual screws which secure the cover plate in position. A twisted bracket 4 is secured to the other side of the base plate 1 and extends to one of the side bars 5 of the automobile, thus securely bracing the device. This base plate is provided with three slots 6, 7 and 8 in which the brake pedal, the reverse pedal and the clutch pedal, respectively, slide. A cover plate 9 is spaced from the base plate 1 by means of spacing bars 10. (See Figures 2 and 3.) This cover plate carries a lock 11 which projects through the floor 12 of the car. These spacing bars 10 are so arranged as to provide guideways for a series of plungers 13, 14 and 15. The plunger 13 is adapted to be projected across the slot 7 while the plunger 14 and 15 are adapted to be projected across the slot 8 from opposite sides thereof and adjacent opposite ends.

Figure 2:
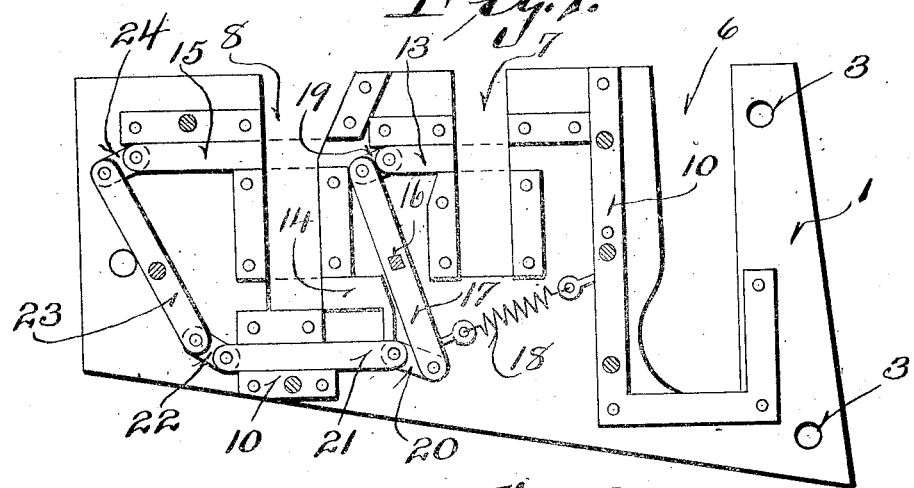
Figure 2 is a view on an enlarged scale corresponding to Figure 1 showing the device as it appears when the top cover is removed certain of the parts being in section.
Figure 3:
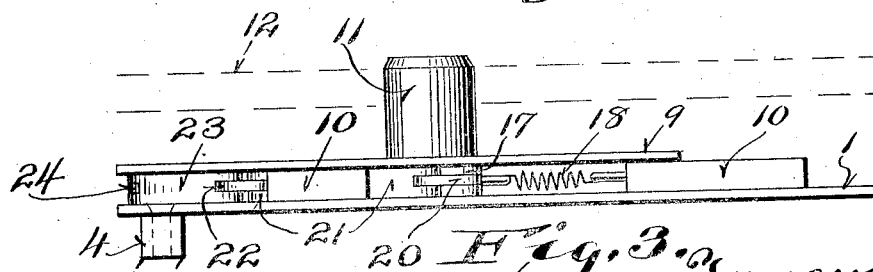
Figure 3 is a side elevation of the structure shown in Figure 1 showing in dotted lines the floor of the car.

It is to be noted from Figure 2 that the spacing bars 10 are positioned so as to receive and securely brace the projecting end of each of the bars or tongues 13, 14 and 15, and to protect their ends against tampering.

The lock 11 is provided with a rectangular spindle 16 which is socketed within the central portion of a lever 17, one end of the lever being resiliently urged towards open position by means of a spring 18. (See Figure 2.) Thus when the lock is operated the lever 17 is operated in a clockwise direction and through mechanism hereinafter described projects the plunger or tongues into locking position.

The forward end of the lever 17 is connected by means of a short link 19 with the plunger 13. Its lower end is connected by means of a link 20 to a slide 21, such slide being guided through certain of the spacing bars 10, as clearly shown in Figure 2.

It is to be noted that the slide 21 carries the plunger 14 and projects such plunger towards the left hand side and completely across the slot 8 when the lever is rocked in the clockwise direction. The left hand end of the slide 21 is connected by means of a link 22 with the lower end of a lever 23, the forward end of such lever being connected by means of a link 24 with a plunger 15, thus when the lock is operated the plungers are projected across the slots, as clearly shown in Figure 1.

It will be seen that when the lock is turned in the reverse direction, the plungers are simultaneously retracted and the spring 18 aids in maintaining these plungers in their retracted positions, and prevents inadvertent operation thereof.

It will be seen that the clutch pedal is readily locked between the plungers 15 and 14, and that the reverse lever is securely locked in the slot 7 by means of the plunger 13.

It is to be noted that all portions of this locking device are formed from stock material and consequently such locking device may be very cheaply manufactured. It is also to be noted that the device may be most easily applied to existing types of machines with a minimum of work.

Although the invention has been described in considerable detail, it is to be understood that the invention may be variously embodied and is, therefore, to be limited only as claimed.

I claim:

1. A pedal lock for automobiles comprising a pair of spaced plates having slots for said pedals, a lock carried by the uppermost of said plates, the lowermost of said plates being adapted for attachment to the transmission, a bracket secured to the lowermost of said plates and adapted for attachment to the side frame bar of the automobile, plungers operatively connected to said lock and adapted to slide transversely across said slots, means for guiding said plungers and means for receiving the ends of said plunger when they have been projected across said slots.

2. A pedal lock for automobiles comprising a pair of spaced plates, a lock carried by one of said plates, said plates having slots for the reception of the pedals of an automobile, a plunger positioned between said plates and operatively connected to said lock and actuated thereby and adapted to be projected across one of said slots, and a pair of plungers positioned between said plates and operatively connected to said lock and actuated thereby and adapted to be projected across another of said slots, a lever operatively connecting opposite ends of said pairs of plungers and adapted to move said plungers in opposite directions, whereby said pedal lock may be applied to a standard automobile without requiring modification of the structure of the automobile.

In testimony that I claim the foregoing I have hereunto set my hand at Janesville, in the county of Rock and State of Wisconsin.

AUSTIN A. KAKUSKE.